June 10, 1924.
G. C. SWEENY
SPEED CONTROL PEDAL FOR MOTOR VEHICLES
Filed Nov. 24, 1922
1,497,612
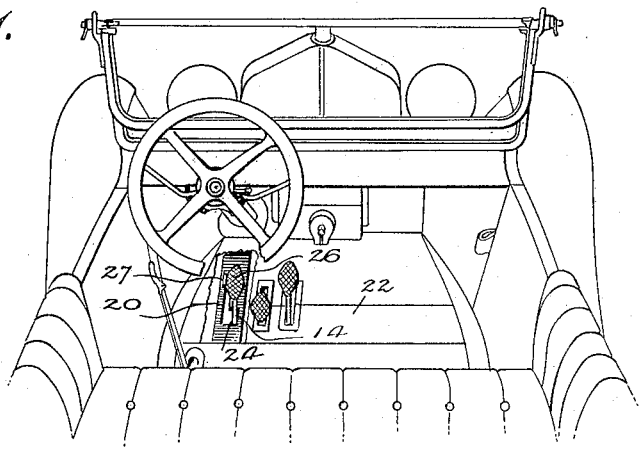
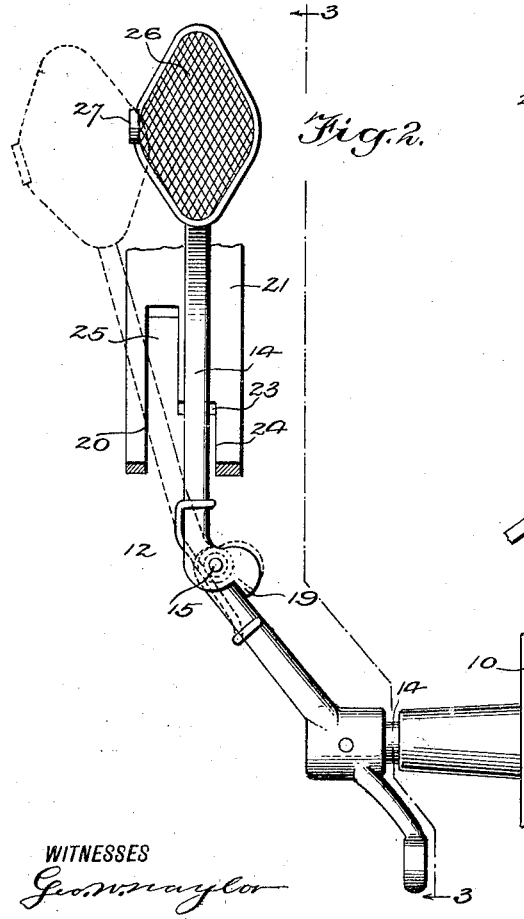
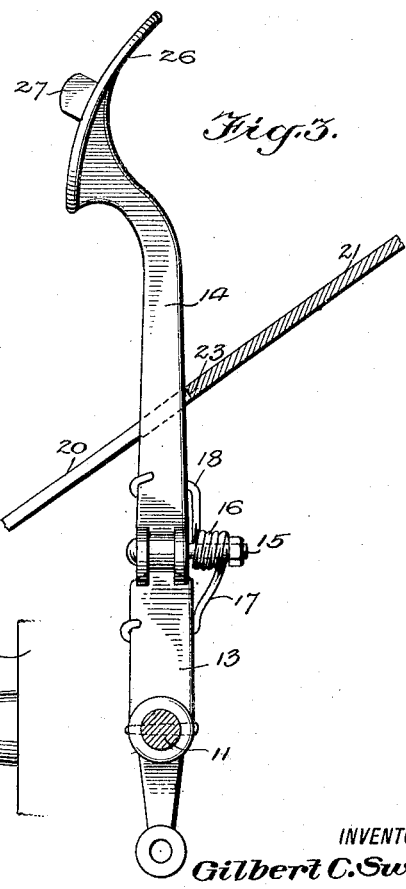
WITNESSES
INVENTOR
Gilbert C. Sweeny
BY
ATTORNEYS Patented June 10, 1924.

1,497,612

UNITED STATES PATENT OFFICE.

GILBERT C. SWEENY, OF BROOKLYN, NEW YORK.

SPEED-CONTROL PEDAL FOR MOTOR VEHICLES.

Application filed November 24, 1922. Serial No. 603,035.

*To all whom it may concern:*

Be it known that I, GILBERT C. SWEENY, a citizen of the United States, and a resident of the city of New York, borough of Brooklyn, in the county of Kings and State of New York, have invented a new and Improved Speed-Control Pedal for Motor Vehicles, of which the following is a full, clear, and exact description.

This invention has relation to a control pedal for the speed mechanism of motor vehicles and has particular reference to an improvement in the high and low speed pedal of Ford automobiles.

At the present time the high and low speed pedal of a Ford car is pushed forward by the operator to the full extent for low speed and allowed to mechanically move rearwardly to the full extent for high speed. In order to obtain a neutral position of the transmission, the operator of the vehicle must become adept to pressing forward the pedal a predetermined distance, which is accomplished only by constant practice. This method of throwing the transmission to neutral is peculiar to the Ford car and therefore operates as a disadvantage to the drivers of other makes of vehicles when attempting to operate a Ford, as the tendency in an emergency is to press forward on both the transmission and brake pedal to bring the car to a stop.

It is, therefore, the principal object of the present invention to overcome the above-recited objections by providing a positive stop with which the high and low speed pedal of a Ford car may coact to insure the neutral position of the transmission.

As a further object the invention contemplates an improved high and low speed pedal for Ford cars which is readily applicable to the transmission mechanism thereof without materially changing the same, and which, when applied, functions to positively stop the pedal in a position to render the transmission neutral.

The invention further aims to provide a device of the character described, which is extremely simple in its construction and mode of operation, inexpensive to manufacture and install and which is thoroughly reliable and highly efficient in its purpose.

With the above recited and other objects in view the invention resides in the novel construction, combination and arrangement of parts set forth in the following specification, particularly pointed out in the appended claims and illustrated in the accompanying drawings, it being understood that variations and modifications which properly fall within the scope of the appended claims may be resorted to when found expedient.

In the drawings:—

Figure 1 is a fragmentary perspective plan view illustrating the improved form of pedal in applied position.

Figure 2 is an enlarged detail transverse sectional view illustrating respectively in full and dotted lines the position of the pedal when in neutral position and when in a position to be advanced for low speed.

Figure 3 is a longitudinal sectional view taken approximately on the line 3—3 of Figure 2.

Referring to the drawings by characters of reference, 10 designates the transmission housing from which the high and low speed shaft 11 protrudes and with which the high and low speed pedal 12, constituting the invention, is connected. The pedal 12 includes the angularly disposed inner stationary section 13 and the laterally movable outer section 14 which is hingedly connected as at 15 to the section 13. A coil spring 16 surrounds the hinge 15 and the opposite extremities 17 and 18 thereof respectively engage the stationary and movable sections 13 and 14 to normally effect the engagement of the stop shoulder 19 on the movable section with the stationary section. The section 14 is movable in the L-shaped slotted portion 20 of a strap 21, which underlies the floor boards 22 of the dash. The L-shaped slotted portion of the strap 21 affords a stop shoulder 23 at the juncture of the rear portion of the slot with the forward portion 25 thereof. The spring 16 operates to normally throw the section 14 to a position for operating between the shoulder 23 and the rear end of the portion 24 of the slot. The foot engaging portion 26 of the pedal is provided at its outer side with a lug 27 whereby the operator by side movement of the foot may swing the section 14 laterally and outwardly to clear the shoulder 23 and permit of the pressing forward of the pedal into the forward portion of the slot 25 whereby the low speed is obtained. When the operator allows the pedal to move rearwardly to high speed, the spring 16 will function to throw the movable section 14 to a substantially vertical or upright position, whereby a direct forward push on the pedal will cause the section 14 to engage the stop shoulder 23 and thus obtain the neutral position of the transmission. It is, of course, understood that the floor boards 22 will necessarily be slotted to conform to the slotted portion 20 of the strap 21.

I claim:

1. The combination with the speed control pedal of a planetary transmission, of means for positively stopping said pedal in its intermediate neutral position when moved from high to low speed position and for permitting of free movement of the same conversely from low to high speed position, said means comprising a slotted guide element having one of the side walls thereof which defines the slot provided with an inwardly projecting step portion disposed in the normal path of movement of the pedal, the said pedal being laterally movable and provided with means for normally disposing the same in a path of movement for engaging the step portion.

2. The combination with a planetary speed transmission, of means for controlling the operation of the transmission comprising a foot pedal operatively connected therewith having an outer section pivotally connected thereto for lateral movement, a plate having a slot therein through which the pivotally connected section of the pedal is movable, one of the side walls of said slot having a lateral offset portion defining a shoulder intermediate of the length of said side wall, means for normally swinging the pivoted section of the pedal against said side wall, and an upstanding lug at the free end of the pivoted section of the pedal for engagement by the foot to effect the swinging of said pedal section away from said wall to clear the shoulder during its movement from a high speed position to a low speed position, said slot permitting of free movement of the pedal from low speed to high speed position.

3. The combination with the transmission of a Ford automobile, of means for controlling the operation thereof comprising a speed control pedal having an outer section pivotally connected thereto for relative lateral movement and a plate having an opening therein affording a straight slot of sufficient length to permit of the movement of said pedal from low to high speed position, said opening defining an offset from said slot arranged parallel to said straight part and extending a sufficient distance to permit the movement of the pedal from high speed position to neutral, means for normally swinging the pivoted section of the pedal toward the side of the opening having the offset, and means on the free end of the pivoted section for engagement by the foot to effect the swinging of said section out of the offset to permit of movement of the pedal to low speed position.

GILBERT C. SWEENY.